United States Patent
Lahti et al.

(10) Patent No.: US 8,925,086 B2
(45) Date of Patent: Dec. 30, 2014

(54) SOFTWARE VIRUS PROTECTION

(75) Inventors: Pasi Lahti, Helsinki (FI); Ismo Bergroth, Helsinki (FI); Simo Huopio, Helsinki (FI)

(73) Assignee: F-Secure Oyj, Helsinki (FI)

( * ) Notice: Subject to any disclaimer, the term of this patent is extended or adjusted under 35 U.S.C. 154(b) by 2420 days.

(21) Appl. No.: 11/724,233

(22) Filed: Mar. 15, 2007

(65) Prior Publication Data

US 2007/0220608 A1 Sep. 20, 2007

Related U.S. Application Data

(63) Continuation-in-part of application No. 09/939,717, filed on Aug. 28, 2001, now abandoned.

(30) Foreign Application Priority Data

Aug. 31, 2000 (GB) .................................. 0021282.1

(51) Int. Cl.
*G06F 12/14* (2006.01)
*G06F 21/56* (2013.01)

(52) U.S. Cl.
CPC .................................. *G06F 21/564* (2013.01)
USPC ......................................................... 726/24

(58) Field of Classification Search
USPC .............................................. 726/22, 23, 24
See application file for complete search history.

(56) References Cited

U.S. PATENT DOCUMENTS

| | | | |
|---|---|---|---|
| 5,896,566 A | 4/1999 | Averbuch et al. | |
| 5,948,104 A | 9/1999 | Gluck et al. | |
| 6,035,423 A | 3/2000 | Hodges et al. | |
| 6,085,100 A | 7/2000 | Tarnanen | |
| 6,192,237 B1 | 2/2001 | Clapton et al. | |
| 6,269,456 B1* | 7/2001 | Hodges et al. | 714/38 |
| 6,275,710 B1 | 8/2001 | Oinonen et al. | |
| 6,560,456 B1 | 5/2003 | Lohtia et al. | |
| 6,683,860 B1 | 1/2004 | Forssell et al. | |
| 6,687,743 B1* | 2/2004 | Innes | 709/206 |
| 6,728,547 B1 | 4/2004 | Frank et al. | |
| 6,741,854 B2 | 5/2004 | Kuhn et al. | |
| 6,792,543 B2 | 9/2004 | Pak et al. | |
| 6,799,197 B1 | 9/2004 | Shetty et al. | |
| 6,842,861 B1* | 1/2005 | Cox et al. | 713/188 |
| 6,892,241 B2 | 5/2005 | Kouznetsov et al. | |
| 7,017,187 B1 | 3/2006 | Marshall et al. | |
| 2002/0168111 A1 | 11/2002 | Latva-Aho | |
| 2004/0083384 A1 | 4/2004 | Hypponen | |

FOREIGN PATENT DOCUMENTS

| | | |
|---|---|---|
| AU | 721498 | 7/1997 |
| EP | 0786916 A1 | 7/1997 |
| WO | WO 98/38820 | 9/1998 |

OTHER PUBLICATIONS

F-Secure: "F-Secure Announces World's First Anti-Virus Product for Wireless Information Devices", Internet Article, Aug. 9, 2000, pp. 1-2. URL: http://www.europe.f-secure.com/news/2000/news?2000080900.html.

* cited by examiner

*Primary Examiner* — Ellen Tran
(74) *Attorney, Agent, or Firm* — Squire Patton Boggs (US) LLP

(57) ABSTRACT

A method of protecting a wireless device against viruses, comprising maintaining a database of virus signatures on the device, updating the database by downloading virus signatures in a Short Message Service (SMS) Message, and searching for virus signatures in the memory of or files stored on the wireless device by comparison with the database.

12 Claims, 2 Drawing Sheets

SOFTWARE VIRUS PROTECTION

CROSS REFERENCE TO RELATED APPLICATION

This is a continuation-in-part application of U.S. application Ser. No. 09/939,717 filed Aug. 28, 2001 and claims priority from Great Britain Application No. 0021281.1 filed Aug. 31, 2000 the contents which are incorporated herein.

FIELD OF THE INVENTION

The present invention relates to software virus protection, and in particular to virus protection for wireless devices.

BACKGROUND

Viruses are a serious problem to users of computers. In order to combat the problem, there are a variety of anti-virus software products available which are able to identify viruses resident in the files or memory of a computer. Modern anti-virus software, such as for example F-Secure Anti-Virus for Windows NT, uses a virus signature comparison in order to identify viruses. Each virus contains code which can be analysed and recorded on a database. The database need not record all of the code contained in a virus if a unique "digital fingerprint" or signature can be recorded instead. This may be for example the overall pattern of the code, or two or three particular lines. When a signature comparison is made, the anti-virus program searches for viruses by scanning a file for the presence of a virus signature such as are present in the database.

Clearly, if effective protection is to be maintained, the database used by the anti-virus software must contain signatures for all known viruses. Unfortunately, new viruses are detected all the time, currently at the rate of one per day. Once a newly detected virus has been analysed by the anti-virus software provider and a signature created, the database must be updated on all of the computers which are using the anti-virus software. There have been various methods up until now for carrying out this update.

The earliest method used by virus software providers was to send a diskette through the mail to registered users of the anti-virus software, this diskette containing the required update to the database. Conventionally, the update takes the form of a ".dat" file containing signatures for all currently identified viruses. Another method has been to make the database update available on-line, so that it can be obtained by connecting to a remote server maintained by the anti-virus software provider. Updates have also been provided in the form of attachments to e-mail.

Increasingly, mobile phones are being used to connect to the Internet. Mobile Internet access is being facilitated by new networks (incorporating HSCSD and GPRS) as well as other protocols such as WAP. As mobile "platforms" with wireless modems and internet connections become more powerful, Internet connections will be as easy to obtain as for a desktop PC. This increase in the usage and capacity of mobile platforms renders them susceptible to attack by viruses. The methods outlined above for updating anti-virus software can also be used for mobile platforms. However, in general they will not be permanently connected to the Internet, and indeed may only connect to the Internet occasionally. In addition, Internet connections can be expensive, and this discourages use. This can lead to the signature database used by anti-virus software becoming out of date, rendering protection incomplete. Out of date protection can be worse than no protection at all, as it can engender a false sense of security in a user.

U.S. Pat. No. 6,799,197 describes a secure method for delivering anti-virus updates to mobile clients. It is suggested that the Wireless Application Protocol (WAP) can be used to provide the secure communication channel. As is well known, WAP data can be transported over any (wireless) data network. In GSM (and UMTS) networks, WAP is primarily transported over GPRS bearers, and such bearers would certainly provide the bandwidth to transport the requisite .dat files (typically these are several thousands of Kbytes in size). This approach suffers however from the disadvantages already noted, namely the requirement on the part of a user to initiate a connection, and the associated cost.

In order to overcome the requirement for a user to initiate a data connection, it might be possible to utilise WAP Push messages. A WAP push message can be sent from the network side to the mobile platform inside a Short Message Service message, and upon receipt at the mobile platform causes the platform to establish a (GPRS) bearer and download the .dat file from the anti-virus provider's server. However, this approach does not solve the cost issue, and also presents problems where for some reason a data bearer cannot be established, e.g. due to poor network coverage or user mobility.

SUMMARY OF THE INVENTION

It has been recognised that transporting entire .dat files over a wireless network is inefficient in terms of bandwidth consumption, given that an update may be triggered by the identification of only a single or small number of new viruses. A better approach is to allow the update of the signature database at the mobile platform with individual virus signatures as these are detected by the anti-virus provider. One or a small number of signatures will occupy only a few hundred bytes or so, and can be accommodated within a single (or possibly a few) text message, i.e. SMS or USSD messages.

According to a first aspect of the present invention there is provided a method of providing incremental updates to a virus signature database stored in the memory of a mobile wireless platform and used by anti-virus software operating on the mobile wireless platform, the method comprising:

at a network server, maintaining a server database containing signatures for identified viruses;

when a new virus is identified, adding a signature for that virus to said server database;

generating a Short Message Service or Unstructured Supplementary Services Data message containing said signature, and sending said message to the mobile wireless platform over a cellular radio access network; and upon receipt of said message at the mobile wireless platform, adding the signature to the virus signature database.

Preferably, the network is a GSM based network or an evolved GSM network such as GSM phase 2 (including GPRS) or UMTS (3GPP).

The SMS protocol, as set out for example in the ETSI GSM 03.40 specification, is a protocol which is well known and widely used for data transfer between mobile devices. For example, programs executing on top of the EPOC operating system have access to SMS communications.

In order to prevent the update information from attack, the payload of the message carrying the update data is preferably cryptographically signed.

The mobile platform may be a mobile telephone, communicator, PDA, palmtop or laptop computer, or any other suitable platform.

The mobile platform may send a report to a management centre following the successful receipt and installation of the update data. More preferably, this is returned to a management centre using an SMS message.

According to a second aspect of the present invention there is provided a method of protecting a mobile wireless platform against viruses, comprising:

maintaining a database of virus signatures on the platform;

updating the database by receiving virus signatures contained in one or more Short Message Service or Unstructured Supplementary Services Data messages sent over a cellular radio access network; and searching for virus signatures contained in the database.

According to a third aspect of the present invention there is provided a mobile wireless platform arranged in use to provide anti-virus protection by maintaining a database of virus signatures, receiving over a cellular radio network Short Message Service or Unstructured Supplementary Services Data messages containing virus signatures for newly identified viruses, incrementally updating said database with the received virus signatures, and scanning data held by or received on the platform for viruses matching signatures contained in the database.

According to a fourth aspect of the present invention there is provided a method of providing incremental updates to a virus signature database stored in the memory of a mobile wireless platform and used by anti-virus software operating on the mobile wireless platform, the method comprising:

at a network server, maintaining a server database containing signatures for identified viruses;

when a new virus is identified, adding a signature for that virus to said server database, and making the signature available at a Multimedia Messaging Service Center;

generating a Multimedia Messaging Service notification containing a link to said signature at said Center, and sending the notification to said mobile wireless platform;

upon receipt of said notification at said mobile wireless platform, establishing a data connection over a cellular radio network, and using said link to download the signature; and adding the signature to the virus signature database.

According to a fifth aspect of the present invention there is provided a mobile wireless platform arranged in use to provide anti-virus protection by maintaining a database of virus signatures, receiving a Multimedia Messaging Service notification containing a link to a storage location for signatures corresponding to newly identified viruses, establishing a data connection over a cellular radio network and using said link to download the virus signature(s), incrementally updating said database with the downloaded virus signature(s), and scanning data held by or received on the platform for viruses matching signatures contained in the database.

DETAILED DESCRIPTION OF CERTAIN EMBODIMENTS

Figure 1:
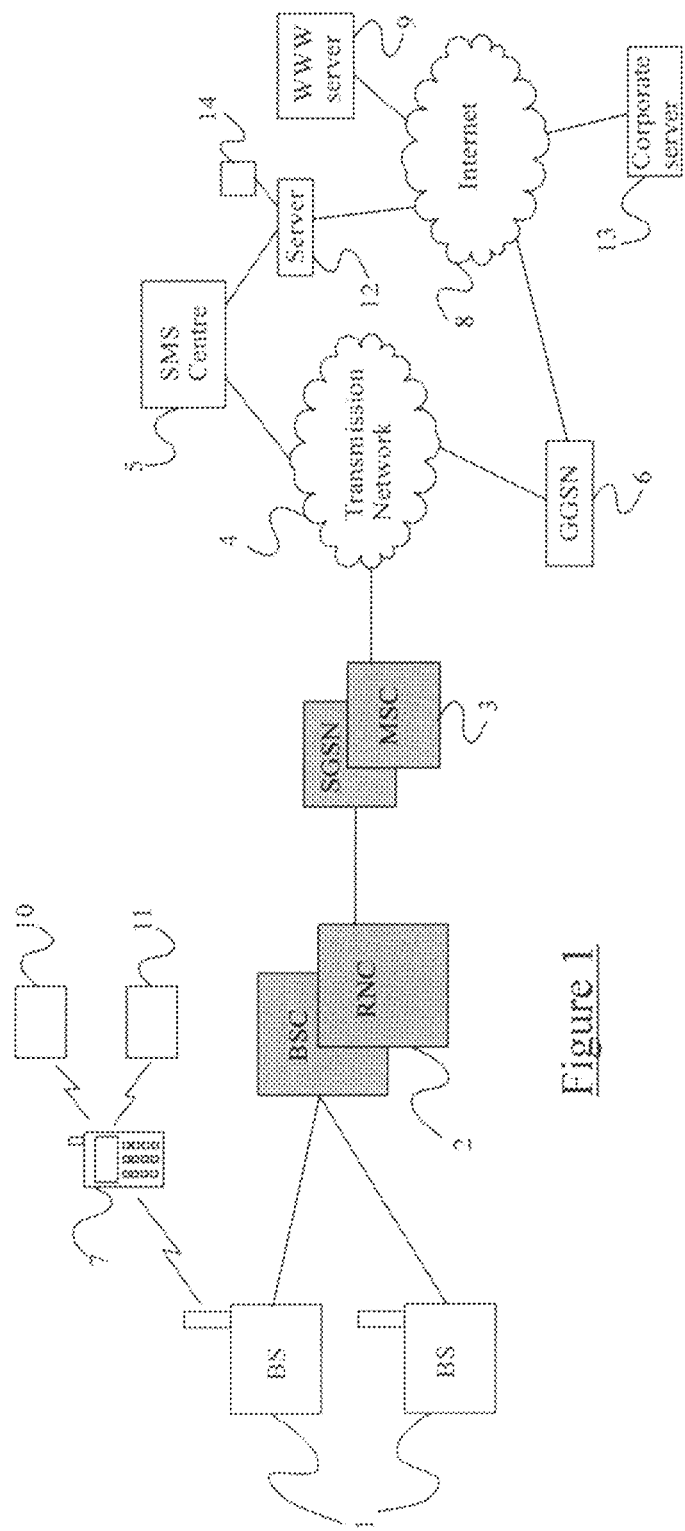
FIG. 1 is a schematic diagram showing a system according to a preferred embodiment of the invention.

FIG. 1 illustrates a UMTS Mobile Network comprising a UMTS Terrestrial Radio Access Network (UTRAN) consisting of Base Stations (BS) 1 and Radio Network Controllers (RNCs) 2, and a core network consisting of MSCs (and SGSNs) 3 and a transmission network 4 (RNCs of the UTRAN may be supplemented with BSCs to facilitate interworking with the GSM standard). Also present in the core network are a Short Message Service (SMS) centre 5 and a GPRS Gateway Support Node (GGSN) 6. For the sake of simplicity, FIG. 1 shows only a single RNC 2 and MSC (SGSN) 3. It will be appreciated that further nodes will be present in a UMTS network in practice.

A mobile wireless device 7 can connect to other telecommunication devices (e.g. mobile telephones, fixed line telephones, etc) via the UTRAN and the core network (of course other networks including "foreign" mobile networks and PSTN networks may be involved in such connections). Using the GGSN 6, the device 7 is able to connect to the Internet 8. A user of the mobile wireless device 1 may thus contact for example a remote web server 9 by entering the URL of the web server into his device's Internet browser. The mobile device 1 may also communicate with a bluetooth device 10 and a Local Area Network (LAN) 11. By way of example, the mobile device 1 may use the EPOC™ operating system.

In view of the risk that viruses could be downloaded from another mobile device, from the remote server 9 via the Internet 8, from the bluetooth device 10, or from another node of the LAN 11, the device 1 is provided with an anti-virus software application which may check any files downloaded from an external source, together with files already resident on the device's system. As explained above, this software searches files for virus "signatures" so that, in order to be fully effective, it requires its database of virus signatures to be updated regularly.

There are various known methods for obtaining updates to a database of virus signatures. One method is to periodically receive media (e.g. floppy disks, compact discs) with the updates recorded thereon. However, this is a cumbersome and expensive method and will result in fewer updates being made, with the database never being fully up to date. A better method is for the user of the mobile device to contact a remote web server operated by the provider of the anti-virus software. The necessary data to update the anti-virus database can then be downloaded from that server. As explained above however, very few mobile devices are permanently connected to the Internet, and in may cases users will only connect to the Internet infrequently. This method also relies on the user remembering to connect to the remote anti-virus server periodically in order to obtain the update data. Thus there will again be periods of time during which the database is not fully up to date.

In order to overcome these problems use may be made of the SMS centre 5 within the UMTS core network. SMS is a service provided by current GSM networks for sending short messages over a signalling channel, and is expected to be provided also by UMTS networks.

The SMS centre 5 is located in the core network part of the UMTS network and is coupled to the Internet 8 via an anti-virus server 12 which is operated and controlled by the UMTS network operator. The anti-virus server 12 receives regular updates (e.g. every morning) from an update server 13 maintained by the anti-virus software provider. The SMS server 12 maintains a record of all subscribers to the anti-virus service in a database 13, and initiates virus signature database updates by sending a Short Message Service (SMS) request for each of the registered subscribers (including the user of the mobile device 1) to the SMS centre 5. Upon receipt of a request, the SMS centre 5 generates a corresponding SMS message and send this to the destination mobile device via the Mobile Switching Centre 3 of the core network and the UTRAN. The SMS message contains virus signature data enabling the mobile device 1 to update the anti-virus database to include signatures for those viruses discovered since the last update was made.

As SMS messages can carry only relatively small quantities of information, it may be necessary for the SMS centre 5 to send a "concatenated message", (i.e. several SMS messages) to convey all the necessary information to perform a database update. For the same reason it is desirable to be able to reduce the volume of information sent as part of a virus signature database upgrade. Thus, whilst SMS updates may be sent automatically to all subscribers from the network, it is preferable to send an SMS message to the server 12 from a device 1 (via the SMS centre 5), containing details of which virus signatures are currently stored in the device's signature database. On receipt of such an SMS request, the anti-virus server 12 needs only to issue an SMS request to the SMS centre 5 containing virus signatures not currently on the signature database of the mobile device 1.

Figure 2:
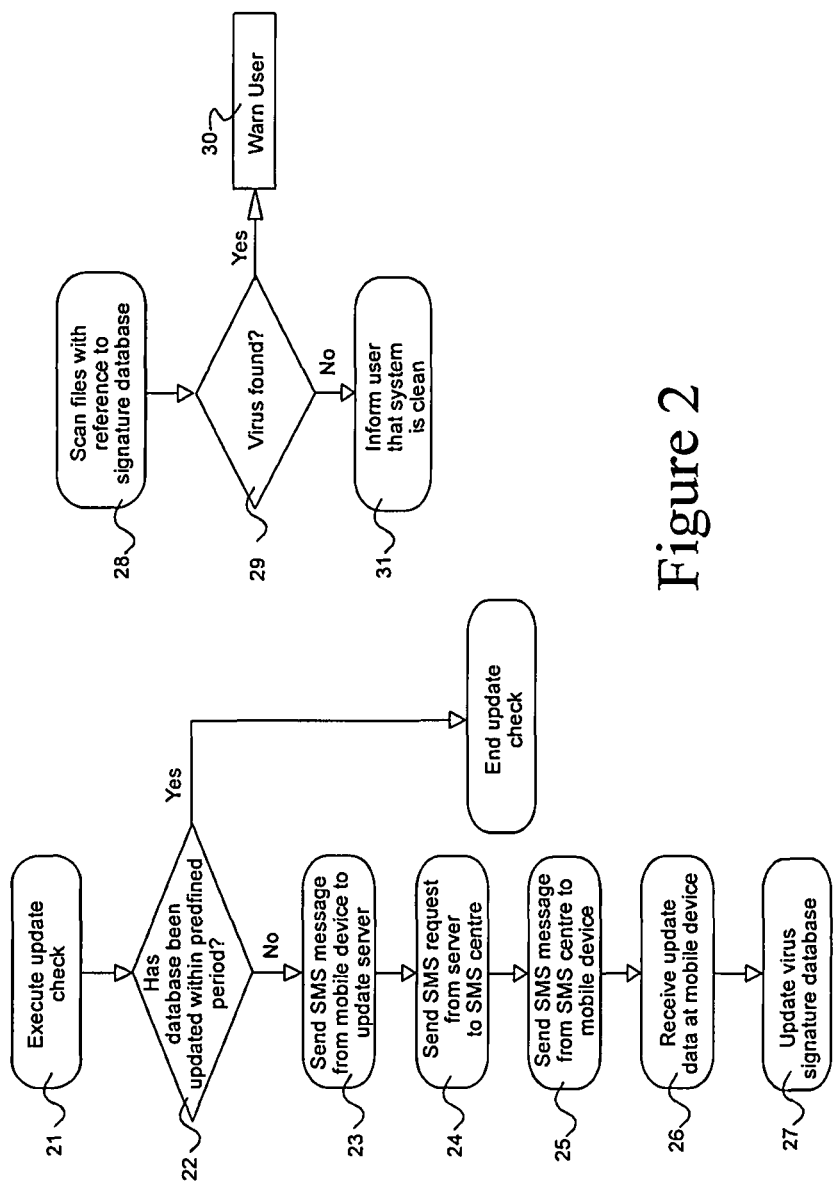
FIG. 2 is a flow diagram of a method of protecting a mobile device from attack by viruses according to a preferred embodiment of the present invention.

As noted in the preceding paragraph, SMS updates may be sent automatically from the network to subscribers, or may be triggered by requests from subscribers. FIG. 2 is a flow diagram illustrating the sequence of steps involved in a subscriber initiated updating process. The mobile device executes the anti-virus software 21. This is usually done when the device is switched on. The anti-virus software, which uses a database of virus signatures, checks to determine when the database was last updated 22. If the last update took place more than a pre-defined period ago, e.g. one week, the software causes the device to send an SMS message 23 to the server anti-virus 12 via the SMS centre 5. This message contains data regarding the current status of the database.

In reply to this SMS message, the anti-virus server 12 returns an SMS request 24 (or several SMS messages forming a "concatenated message") to the SMS centre 5, the request containing signatures for viruses discovered and analysed since the previous update. The SMS centre 5 generates a corresponding SMS message 25 and sends this to the mobile device 1, which receives the message 26 and causes the new signature(s) to be incorporated into the anti-virus signature database for future use 27.

When next requested, or otherwise triggered (e.g. by a scanning scheduler), the anti-virus software scans the files and memory of the mobile device in order to determine the presence of any of the virus signatures in its database 28. If an infected file is discovered 29, the user is warned 30 and given an opportunity to delete or clean that file. Otherwise, once all files have been scanned, the software informs the user that his system is "clean" 31.

As an alternative to the use of SMS/USSD messages to carry update virus signatures, the use of Multimedia Messaging Service messages might be considered. MMS is a GSM/3G service designed for the pushing of multimedia messages to mobile platforms. When a new virus is detected by the anti-virus service provider, the provider may send a MMS request for each subscriber, to a MMS center. The MMS center then sends out MMS notifications to the subscribers. This does not contain the signature itself, but rather a link from which the signature may be downloaded. Upon receipt of the MMS notification, a mobile platform may automatically establish a (GPRS) bearer, and download the signature from the link. Alternatively, the use may be requested to accept the message, only after which the bearer is established and the signature downloaded.

It will be appreciated that there are other embodiments which fall within the scope of the invention. For example, the method of the present invention may be used to update the anti-virus software itself, e.g. by sending software patches.

The invention claimed is:

1. A method of providing incremental updates to a virus signature database stored in the memory of a mobile wireless platform and used by anti-virus software operating on the mobile wireless platform, the method comprising:
at a network server, maintaining a server database containing signatures for identified viruses;
when a new virus is identified, adding a signature for that virus to said server database;
generating a Short Message Service or Unstructured Supplementary Services Data message containing said signature, and sending said message to the mobile wireless platform over a cellular radio access network; and
upon receipt of said message at the mobile wireless platform, adding the signature to the virus signature database.

2. A method as claimed in claim 1, wherein the message carrying the update data is cryptographically signed.

3. A method as claimed in claim 1, wherein the mobile platform comprises a mobile telephone, communicator, PDA, palmtop or laptop computer.

4. A method as claimed in claim 1, and comprising sending the update data in response to a request from the mobile platform.

5. A method as claimed in claim 4, wherein said request identifies the current status of a virus signature database.

6. A method as claimed in claim 1, wherein said message containing a signature for the identified virus is sent to the mobile wireless platform after the virus is identified.

7. A method according to claim 1, wherein said message is generated and sent some predefined time period after a previous signature containing message was sent and contains signatures for all or some viruses identified during that time period.

8. A method according to claim 1, wherein said message is one of a set of messages, the set of messages containing signatures for all viruses identified since a previous signature containing message was sent.

9. A method of protecting a mobile wireless platform against viruses, comprising:
maintaining a database of virus signatures on the platform;
updating the database by receiving virus signatures contained in one or more Short Message Service or Unstructured Supplementary Services Data messages sent over a cellular radio access network; and
searching for virus signatures contained in the database.

10. A mobile wireless platform arranged in use to provide anti-virus protection by maintaining a database of virus signatures, receiving over a cellular radio network Short Message Service or Unstructured Supplementary Services Data messages containing virus signatures for newly identified viruses, incrementally updating said database with the received virus signatures, and scanning data held by or received on the platform for viruses matching signatures contained in the database.

11. A method of providing incremental updates to a virus signature database stored in the memory of a mobile wireless platform and used by anti-virus software operating on the mobile wireless platform, the method comprising:
at a network server, maintaining a server database containing signatures for identified viruses;
when a new virus is identified, adding a signature for that virus to said server database, and making the signature available at a Multimedia Messaging Service Center;

generating a Multimedia Messaging Service notification containing a link to said signature at said Center, and sending the notification to said mobile wireless platform;

upon receipt of said notification at said mobile wireless platform, establishing a data connection over a cellular radio network, and using said link to download the signature; and adding the signature to the virus signature database.

12. A mobile wireless platform arranged in use to provide anti-virus protection by maintaining a database of virus signatures, receiving a Multimedia Messaging Service notification containing a link to a storage location for signatures corresponding to newly identified viruses, establishing a data connection over a cellular radio network and using said link to download the virus signature(s), incrementally updating said database with the downloaded virus signature(s), and scanning data held by or received on the platform for viruses matching signatures contained in the database.

* * * * *